United States Patent
Speirs

(10) Patent No.: US 10,899,320 B1
(45) Date of Patent: Jan. 26, 2021

(54) JACK FOOT ADJUSTMENT DEVICE

(71) Applicant: Clinton Speirs, Vernal, UT (US)

(72) Inventor: Clinton Speirs, Vernal, UT (US)

( * ) Notice: Subject to any disclaimer, the term of this patent is extended or adjusted under 35 U.S.C. 154(b) by 358 days.

(21) Appl. No.: 16/031,229

(22) Filed: Jul. 10, 2018

(51) Int. Cl.
*B60S 9/08* (2006.01)
*B60D 1/66* (2006.01)

(52) U.S. Cl.
CPC . *B60S 9/08* (2013.01); *B60D 1/66* (2013.01)

(58) Field of Classification Search
CPC ..... B60D 1/66; B60S 9/08; B60S 9/04; B60S 9/22; B60S 9/06; B60S 9/02; B66F 3/10; B66F 3/14; B66F 3/08; B66F 1/06; B66F 1/04
USPC ........................ 248/354.1; 254/420
See application file for complete search history.

(56) References Cited

U.S. PATENT DOCUMENTS

| 3,146,002 | A | | 8/1964 | Faber | |
|---|---|---|---|---|---|
| 4,796,864 | A | | 1/1989 | Wilson | |
| 5,011,119 | A | | 4/1991 | Harrington | |
| 5,273,256 | A | * | 12/1993 | Chambers | B60S 9/06 254/425 |
| 5,354,087 | A | | 10/1994 | Head | |
| 6,267,357 | B1 | * | 7/2001 | Ebey | B60S 9/08 254/419 |
| 7,960,659 | B2 | | 6/2011 | Cleary | |
| D653,834 | S | | 2/2012 | Ahrenholtz | |
| 9,308,894 | B2 | * | 4/2016 | Lusty | B60S 9/08 |
| 9,321,434 | B2 | | 4/2016 | Scott | |
| 2011/0253954 | A1 | * | 10/2011 | Fortner | B66F 3/10 254/98 |

FOREIGN PATENT DOCUMENTS

EP 0688687 5/2000

* cited by examiner

*Primary Examiner* — Lee D Wilson
*Assistant Examiner* — Seahee Hong
(74) *Attorney, Agent, or Firm* — Kyle A. Fletcher, Esq.

(57) ABSTRACT

The jack foot adjustment device is a tongue jack for a trailer. The jack foot adjustment device provides both a fine height adjustment accessed by a hand cranked and a gross height adjustment accessed by pushing the foot plate of the device with the user's foot. Retracting the foot plate can be accomplished by turning the hand rack in the opposite direction and/or by pulling the release handle and allowing a foot spring to pull up on the lower foot. The fine height adjustment uses a vertical screw turned by the crank to pull or push an upper foot out of or into the body that is coupled to the trailer. The gross height adjustment uses a spring loaded pawl to allow downward movement of a lower foot while preventing upwards movement of the lower foot unless a handle releases the pawl.

17 Claims, 9 Drawing Sheets

JACK FOOT ADJUSTMENT DEVICE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the fields of trailers and vehicle jacks, more specifically, a jack foot adjustment device.

SUMMARY OF INVENTION

The jack foot adjustment device is a tongue jack for a trailer. The jack foot adjustment device provides both a fine height adjustment accessed by a hand cranked and a gross height adjustment accessed by pushing the foot plate of the device with the user's foot. Retracting the foot plate can be accomplished by turning the hand rack in the opposite direction and/or by pulling the release handle and allowing a foot spring to pull up on the lower foot. The fine height adjustment uses a vertical screw turned by the crank to pull or push an upper foot out of or into the body that is coupled to the trailer. The gross height adjustment uses a spring loaded pawl to allow downward movement of a lower foot while preventing upwards movement of the lower foot unless a handle releases the pawl.

An object of the invention is to provide a tongue jack for a trailer.

Another object of the invention is to allow fine height adjustment of the height of the tongue jack using a hand-cranked vertical screw.

A further object of the invention is to provide a gross height adjustment by pushing down on the lower foot to lower the lower foot.

Yet another object of the invention is to provide a gross height adjustment by pulling up on a release handle and allowing a foot spring pull the lower foot up.

These together with additional objects, features and advantages of the jack foot adjustment device will be readily apparent to those of ordinary skill in the art upon reading the following detailed description of the presently preferred, but nonetheless illustrative, embodiments when taken in conjunction with the accompanying drawings.

In this respect, before explaining the current embodiments of the jack foot adjustment device in detail, it is to be understood that the jack foot adjustment device is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the jack foot adjustment device.

It is therefore important that the claims be regarded as including such equivalent construction insofar as they do not depart from the spirit and scope of the jack foot adjustment device. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

FIG. 2A is a cross-sectional view of an embodiment of the disclosure across 2A-2A as shown in FIG. 2.

FIG. 2B is a detail view of an embodiment of the disclosure as shown in FIG. 2B illustrating the pawl mechanism.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
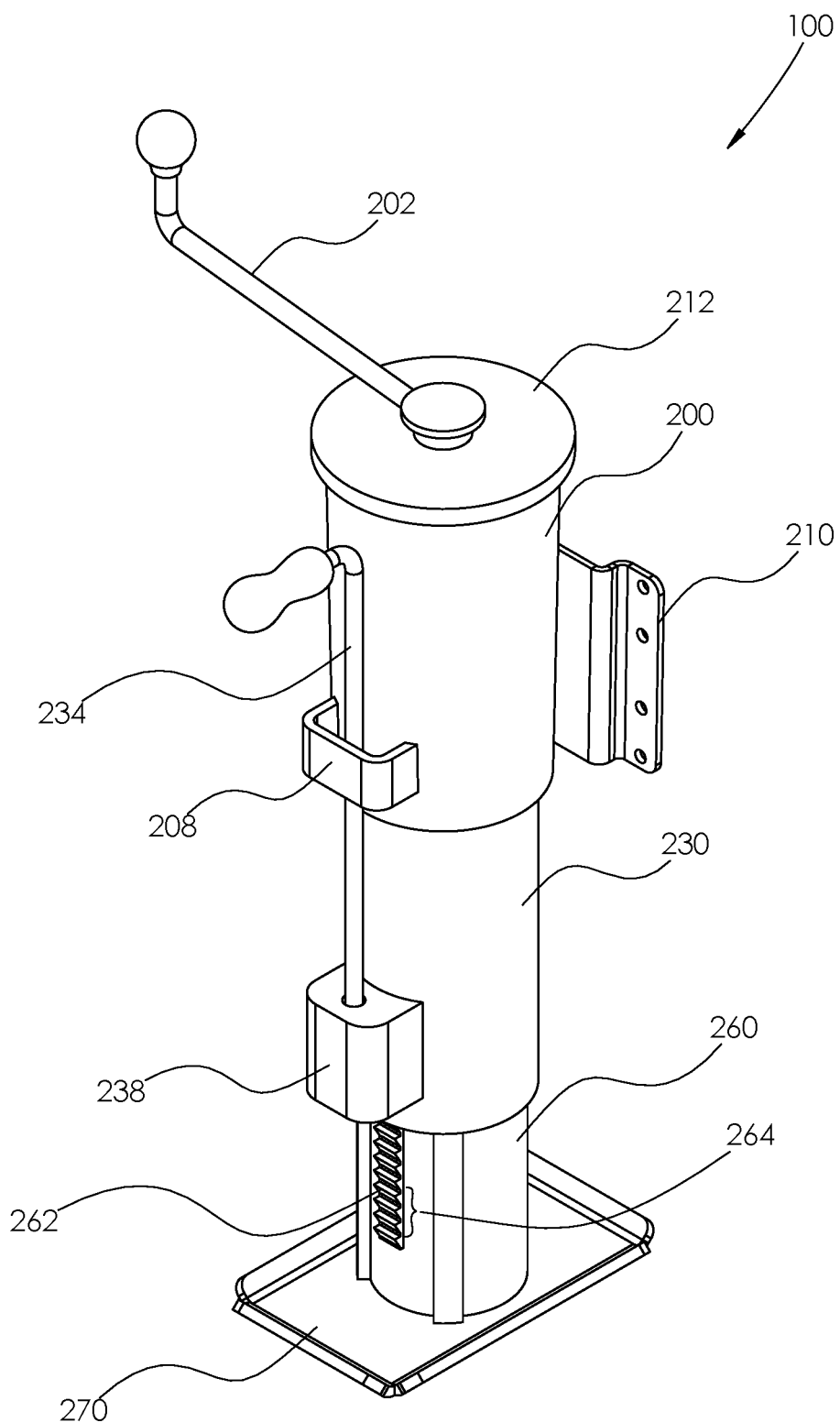
FIG. 1 is a perspective view of an embodiment of the disclosure.
Figure 2:
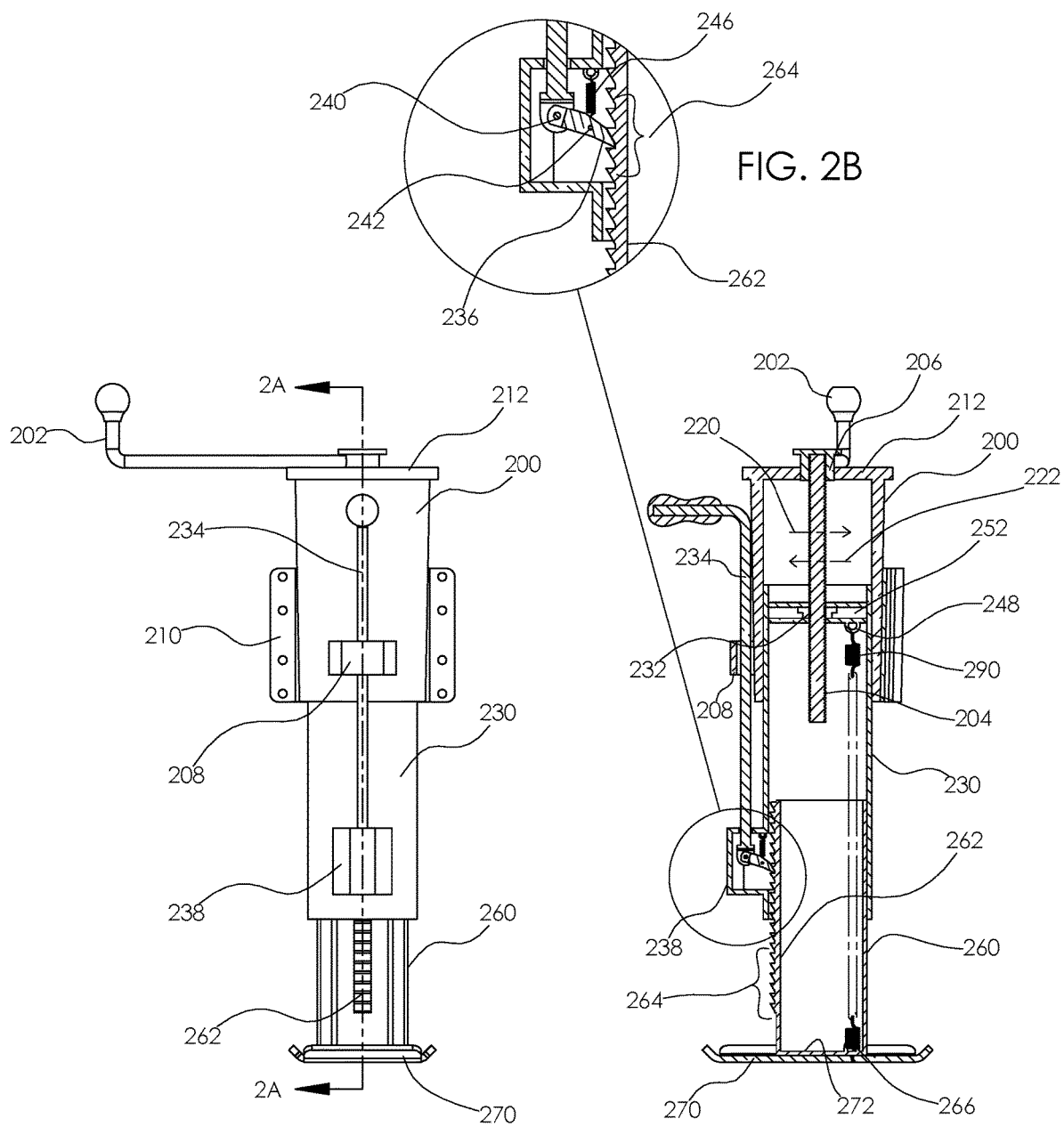
FIG. 2 is a front view of an embodiment of the disclosure.
Figure 3:
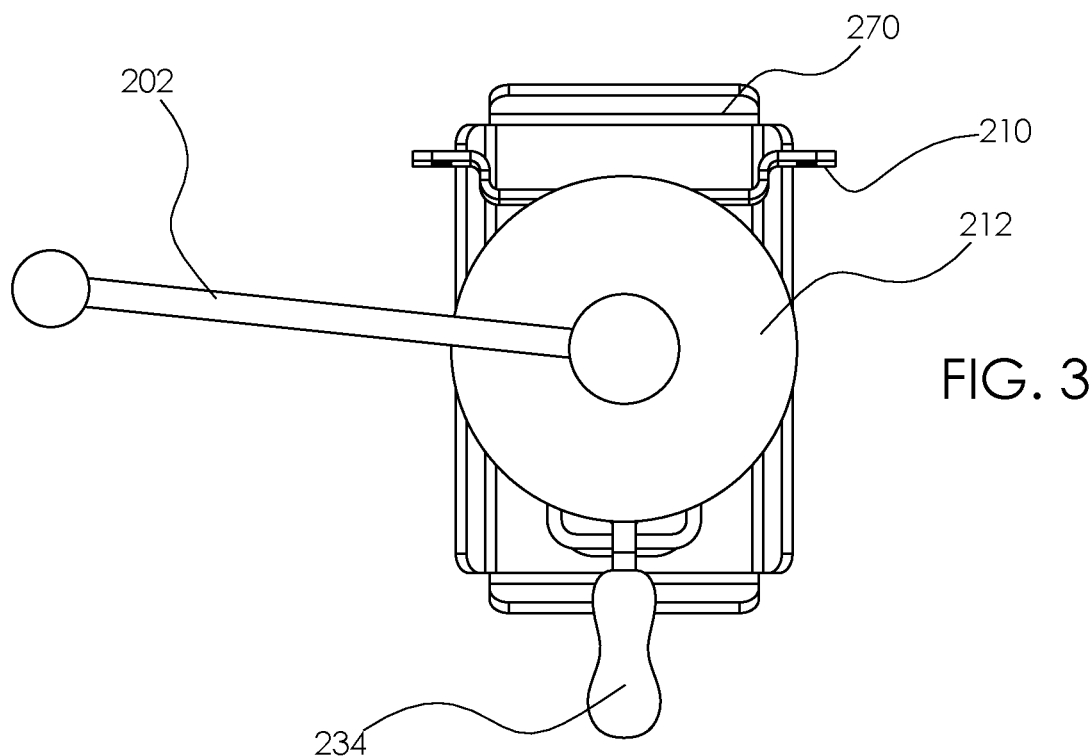
FIG. 3 is a top view of an embodiment of the disclosure.
Figure 4:
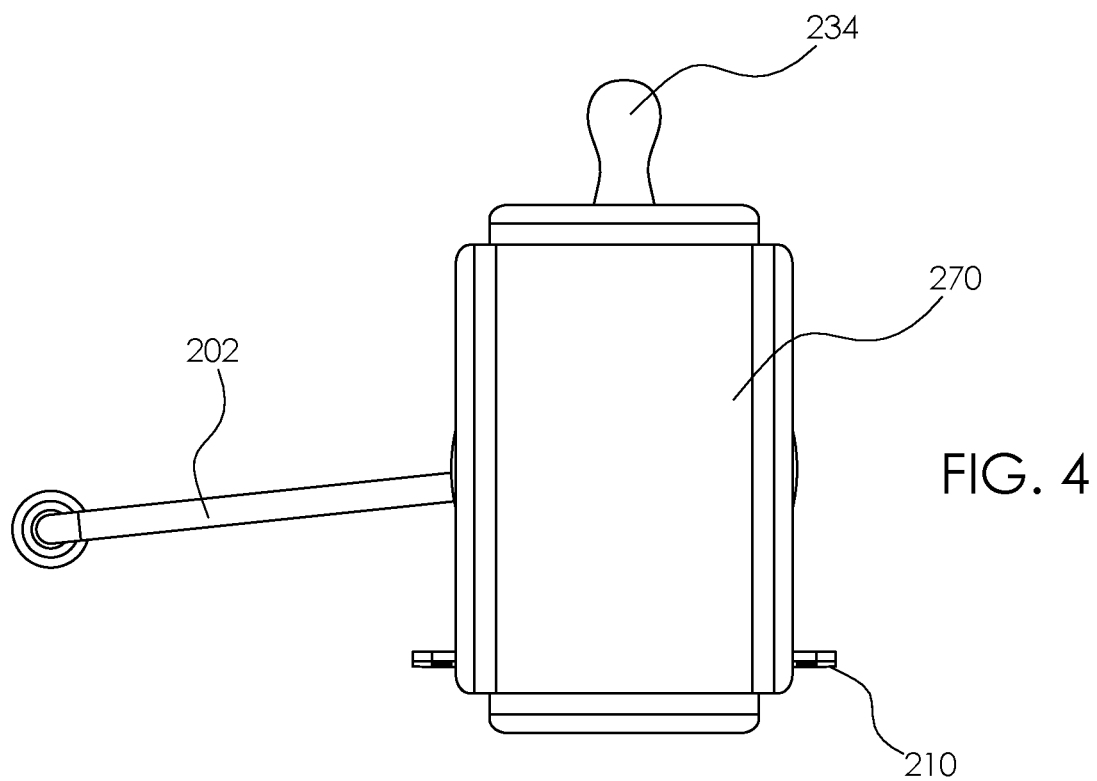
FIG. 4 is a bottom view of an embodiment of the disclosure.
Figure 5:
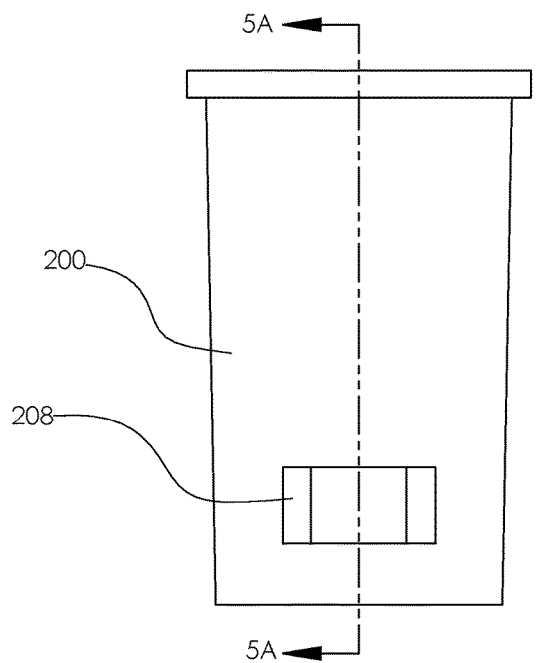
FIG. 5 is a front view of an embodiment of the disclosure illustrating the body.
Figure 5A:
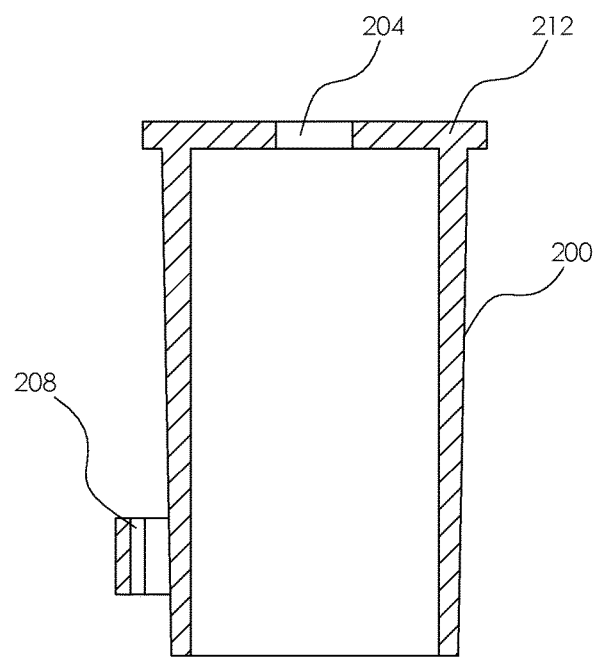
FIG. 5A is a cross-sectional view of an embodiment of the disclosure across 5A-5A as shown in FIG. 5.
Figure 6:
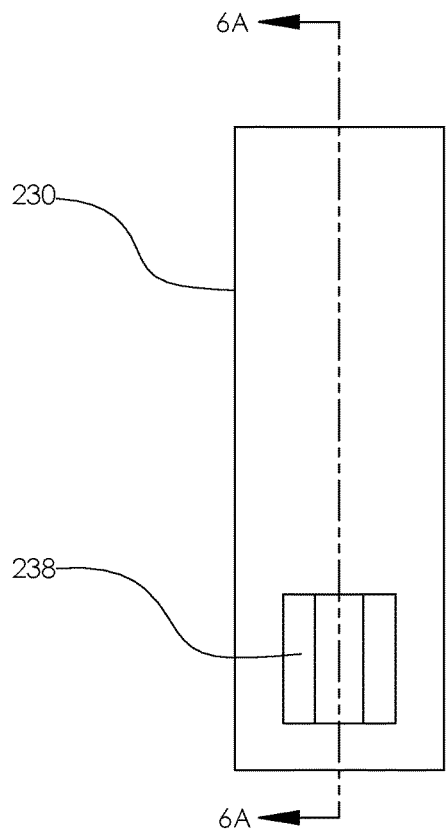
FIG. 6 is a front view of an embodiment of the disclosure illustrating the upper foot.
Figure 6A:
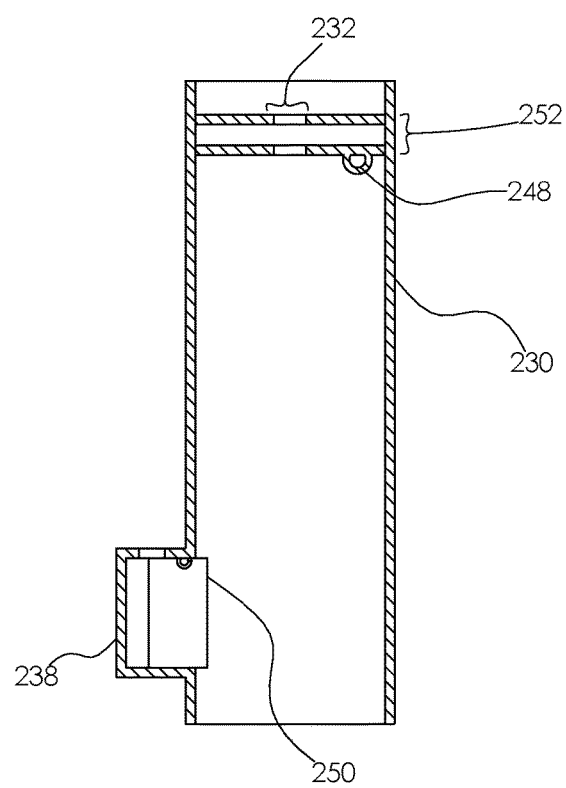
FIG. 6A is a cross-sectional view of an embodiment of the disclosure across 6A-6A as shown in FIG. 6.
Figure 7:
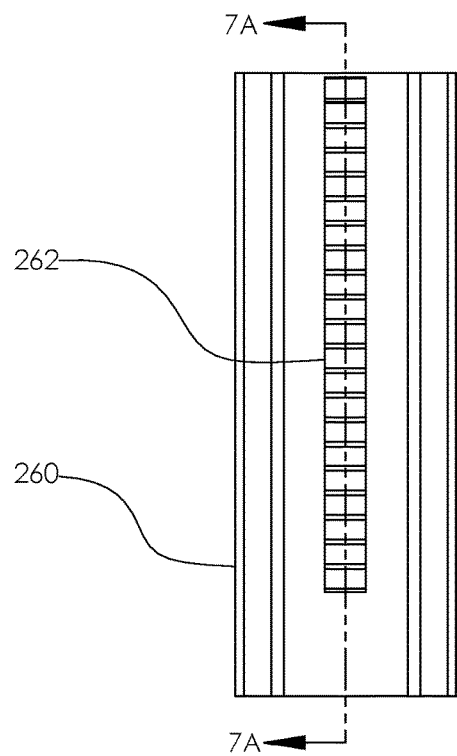
FIG. 7 is a front view of an embodiment of the disclosure illustrating the lower foot.
Figure 7A:
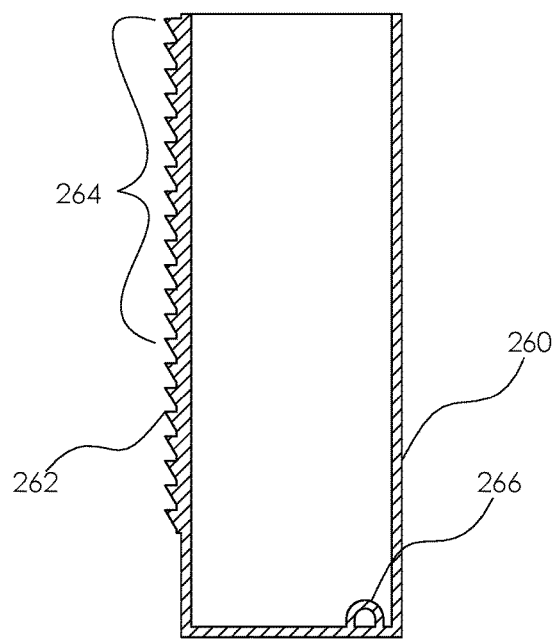
FIG. 7A is a cross-sectional view of an embodiment of the disclosure across 7A-7A as shown in FIG. 7.
Figure 8:
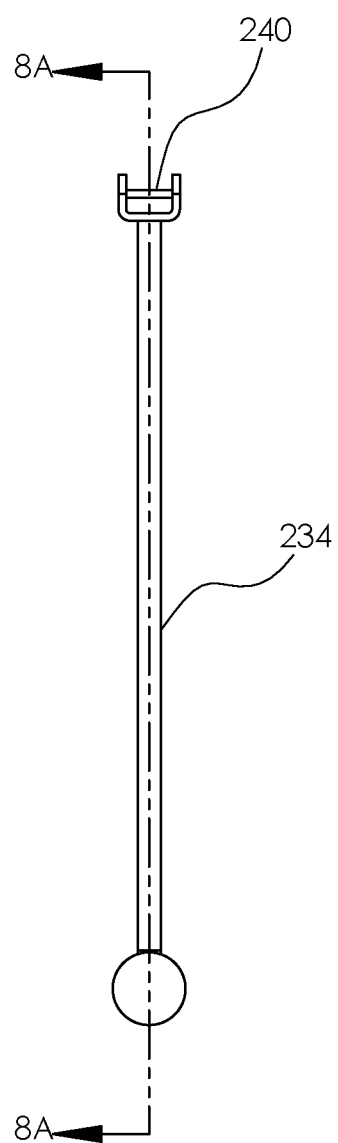
FIG. 8 is a front view of an embodiment of the disclosure illustrating the release handle.
Figure 8A:
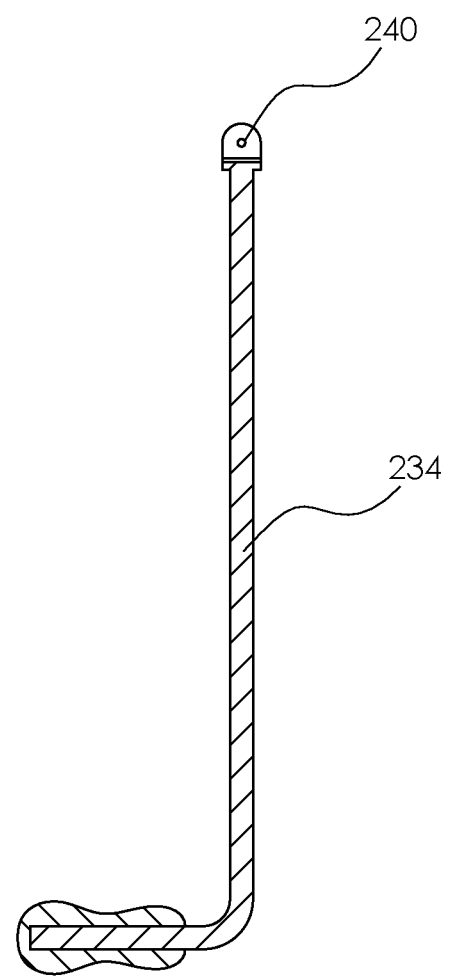
FIG. 8A is a cross-sectional view of an embodiment of the disclosure across 8A-8A as shown in FIG. 8.
Figure 9:
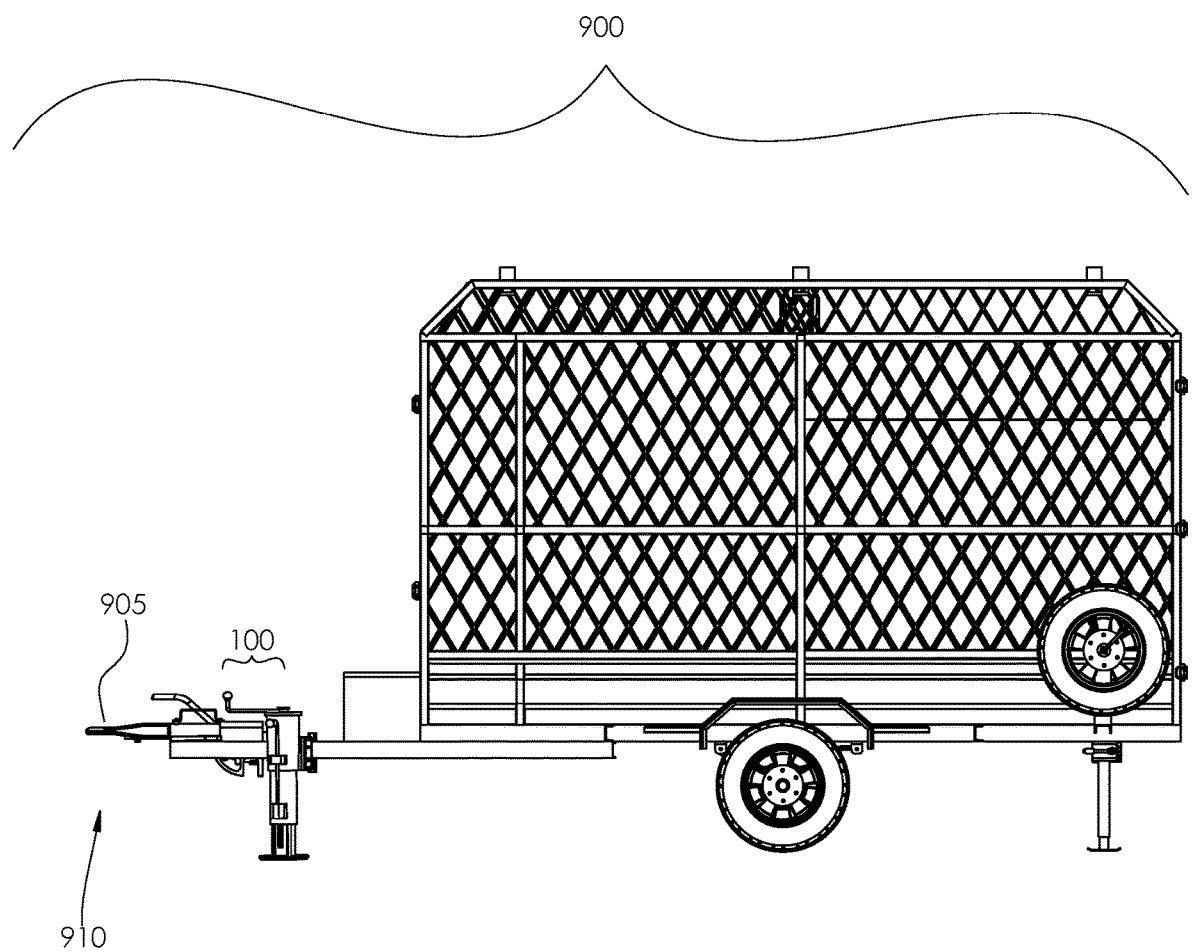
FIG. 9 is an in-use view of an embodiment of the disclosure illustrating the jack foot adjustment device installed on a trailer.
Figure 10:
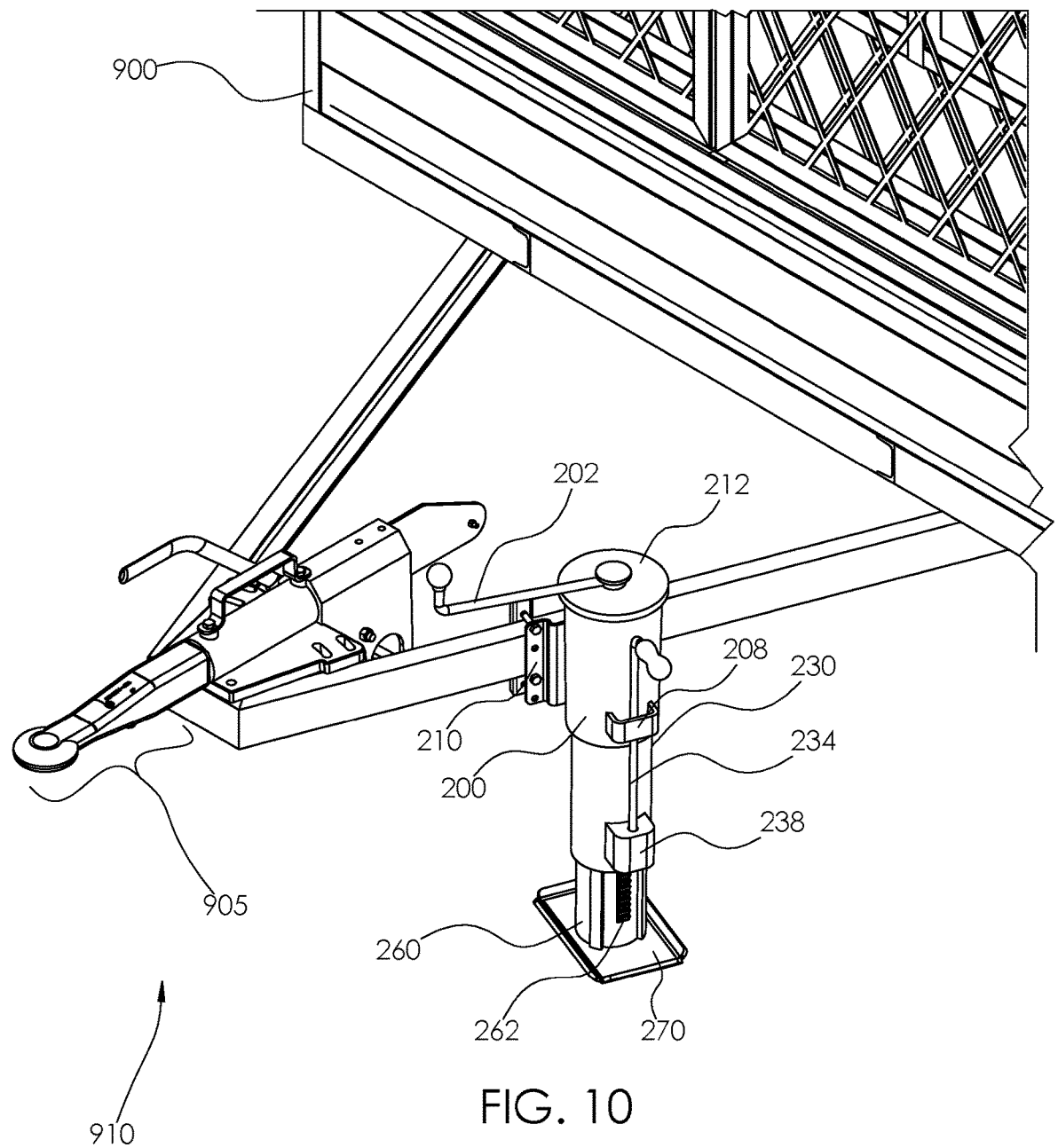
FIG. 10 is a close-up detail of an embodiment of the disclosure illustrating the jack foot adjustment device view.

Detailed reference will now be made to a first potential embodiment of the disclosure, which is illustrated in FIGS. 1 through 10.

The jack foot adjustment device 100 (hereinafter invention) comprises a body 200, an upper foot 230, a lower foot 260, and a foot spring 290. The invention 100 is a tongue jack for a trailer 900. The invention 100 provides a fine height adjustment and a gross height adjustment. The gross height adjustment is a faster but less precise adjustment of the height of the invention 100 than the fine height adjustment. As a non-limiting example, the invention 100 may be adapted to perform the gross height adjustment while standing by pushing down on a foot plate 270 with a foot while using one hand to pull a release handle 234.

The body 200 comprises an adjustment screw 204, a crank handle 202, a bushing 206, a handle guide 208, and a mounting bracket 210. The body 200 may be a cylindrical, upper section of the invention 100. The upper end of the body 200 may be closed by a body top surface 212 except for the bushing 206 located at the center of the body top surface 212.

The adjustment screw 204 may be a vertical rod that passes through the body top surface 212 at the bushing 206. The adjustment screw 204 may be threaded except where it passes through the bushing 206. The adjustment screw 204 may be free to rotate within the bushing 206 however the adjustment screw 204 may be prevented from moving up or down within the bushing 206. The upper end of the adjustment screw 204 may extend above the body top surface 212 where it may couple to the crank handle 202. Moving the crank handle 202 may cause the adjustment screw 204 to turn within the bushing 206. The lower end of the adjustment screw 204 may pass through a threaded aperture 232 of the upper foot 230. As the adjustment screw 204 turns in a first direction 220, it may push the body 200 and the upper foot 230 farther apart. As the adjustment screw 204 turns in a second direction 222, it may pull the body 200 and the upper foot 230 closer together. Moving the crank handle 202 to turn the adjustment screw 204 may provide the fine height adjustment of the height of the invention 100.

The handle guide 208 may be an armature coupled to a side of the body 200 to support the release handle 234. The handle guide 208 may be open on the top and bottom ends of the handle guide 208 and enclosed on three side, with the four side being enclosed by the body 200. The handle guide 208 may allow the release handle 234 to move up and down but may prevent the release handle 234 from moving laterally.

The mounting bracket 210 may be coupled to the body 200. The mounting bracket 210 may couple to the trailer 900, thus coupling the body 200 to the trailer 900. As a non-limiting example, the mounting bracket 210 may be coupled to the trailer 900 using a plurality of mounting screws.

The upper foot 230 comprises the threaded aperture 232, a release frame 238, a pawl 236, a pawl pivot pin 242, the release handle 234, a release handle pin 240, a tensioner spring 246, and an upper spring anchor 248. The upper foot 230 may be a cylindrical, middle section of the invention 100. The upper end of the upper foot 230 may be closed by a foot top surface 252 except for the threaded aperture 232 located at the center of the foot top surface 252. The outside diameter of the upper foot 230 may be smaller than the inside diameter of the body 200 such that the upper foot 230 may slide in and out of the body 200 as the adjustment screw 204 pulls and pushed on the threaded aperture 232.

The threaded aperture 232 may be an aperture on the top center of the upper foot 230 that is threaded with a thread that is complementary to the thread on the adjustment screw 204.

The release frame 238 may be an outward extension of the upper foot 230. The release frame 238 may completely surround the pawl 236 except for an aperture at the top of the release frame 238 where the release handle 234 exits the release frame 238. The release frame 238 may support the pawl 236 and protect the pawl 236 from damage. The release frame 238 may also be adapted to protect a user from injury.

The pawl 236 may be a pivoting bar whose interior end engages with a plurality of teeth 264 of a cog 262 so that the cog 262 can only move in one direction. The pawl 236 may pivot at the pawl pivot pin 242 whose ends are coupled to the release frame 238. The exterior end of the pawl 236 may be the release handle 234. The tensioner spring 246 may be coupled between the release frame 238 and the pawl 236 such that the tensioner spring 246 pulls the interior end of the pawl 236 into the plurality of teeth 264 on the cog 262.

The release handle 234 may be an L-shaped armature that is used to release the pawl 236 from the cog 262. The bottom of the release handle 234 may be pivotably coupled to the pawl 236 via the release handle pin 240. The release handle 234 may extend upwards from the pawl 236 and may pass out of the release frame 238 and through the handle guide 208. The upper end of the release handle 234 may bend away from the body 200 for accessibility. Pulling up on the release handle 234 may cause the pawl 236 to pivot and to disengage from the plurality of teeth 264 of the cog 262. When the pawl 236 is disengaged, the lower foot 260 may be pulled upwards toward the upper foot 230 by the foot spring 290 unless counteracted by an external downward force. The gross height adjustment of the height of the invention 100 may comprise disengaging the pawl 236 by pulling up on the release handle 234 and then allowing the lower foot 260 to move up or down under the influence of the foot spring 290 or the external downward force.

The upper spring anchor 248 may be an eyelet or other mechanical fastener coupled to the inside of the upper foot 230 on the foot top surface 252. The upper end of the foot spring 290 may attach to the upper spring anchor 248.

The lower foot 260 comprises the cog 262, a lower spring anchor 266, and the foot plate 270. The lower foot 260 may be a cylindrical, bottom section of the invention 100. The lower end of the lower foot 260 may be closed by a foot bottom surface 272. The outside diameter of the lower foot 260 and the cog 262 may be smaller than the inside diameter of the upper foot 230 such that the lower foot 260 and the cog 262 may slide in and out of the upper foot 230.

The cog 262 may be a linear gear rack located on an outer side of the lower foot 260. The cog 262 may be oriented vertically. The interaction of the cog 262 with the pawl 236 may allow the lower foot 260 to move down when the external downward force is applied to overcome tension supplied by the foot spring 290 but may prevent upward movement of the lower foot 260. Specifically, when the lower foot 260 is pushed down the pawl may pivot to allow a tooth on the cog 262 to pass the tip of the pawl 236. The pawl 236 may then be pulled back into position against the cog 262 by the tensioner spring 246. When the lower foot 260 attempts to move up, the pawl 236 jams against the cog 262 and will not pivot unless the release handle 234 is pulled to pivot the pawl 236 away from the cog 262.

The lower spring anchor 266 may be an eyelet or other mechanical fastener coupled to the inside of the lower foot 260 on the foot plate 270. The lower end of the foot spring 290 may attach to the lower spring anchor 266.

The foot plate 270 may be a support surface that presses against the ground when the invention 100 is used to support a tongue end 910 of the trailer 900. The foot plate 270 may be wider than the outside diameter of the body 200 in all lateral directions. The foot plate 270 may prevent the invention 100 from sinking into the ground. The foot plate 270 may be adapted to allow the external downward force to be applied by the foot of the user. In some embodiments, the foot bottom surface 272 may be combined with the foot plate 270.

The foot spring 290 may be a spring that lifts the lower foot 260 into the upper foot 230. The foot spring 290 may be coupled between the upper spring anchor 248 on the upper foot 230 and the lower spring anchor 266 on the lower foot 260. The force provided by the foot spring 290 may be such that the foot spring 290 may lift the lower foot 260 if the pawl 236 is disengaged, which is accomplished via pulling up on the release handle 234.

In some embodiments, a spacer 250 may be provided on the inside of the upper foot 230 or on the outside of the lower foot 260 to fill space on either side of the cog 262 such that the cog 262 on the lower foot 260 may slide into the upper foot 230 without a gap between the upper foot 230 and the lower foot 260.

In use, the invention 100 may be coupled to the tongue end 910 of the trailer 900. With the trailer 900 coupled to a vehicle, the invention 100 may be deployed to support the tongue end 910 of the trailer 900. The invention 100 may be deployed by using the foot of the user to push down on the foot plate 270 until the foot plate 270 touches the ground. Pressure applied by the foot causes the lower foot 260 to slide out of the upper foot 230 as the pawl 236 pivots to allow each tooth on the cog 262 to pass by. Pressure applied by the foot overcomes the tension of the foot spring 290. The crank handle 202 may then be used to force the upper foot 230 to slide out of the body 200 and lift a tongue 905 off of a hitch.

To move the trailer 900, the crank handle 202 may be turned to lower the tongue 905 onto the hitch. Once the hitch is supporting the weight of the tongue end 910 of the trailer 900, the release handle 234 may be pulled upwards to disengage the pawl 236 from the cog 262. With the pawl 236 disengaged, the foot spring 290 may pull the lower foot 260 up into the upper foot 230.

DEFINITIONS

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" refers to top and "lower" refers to the bottom. As a non-limiting example, the upper end of a vertical shaft is the top end of the vertical shaft.

As used in this disclosure, an "anchor" is a device that holds an object in place. When used as a verb, "anchor" refers to holding an object firmly or securely.

As used in this disclosure, an "aperture" is an opening in a surface. Aperture may be synonymous with hole, slit, crack, gap, slot, or opening.

As used in this disclosure, a "bushing" is a cylindrical aperture through which an object is guided and potentially secured. Bushings are sometimes used as protective linings to reduce friction and to provide a leak-proof seal.

As used herein, the words "couple", "couples", "coupled" or "coupling", refer to connecting, either directly or indirectly, and does not necessarily imply a mechanical connection.

As used in this disclosure, a "crank" is a handle or an arm that is attached perpendicularly to the axis of rotation of a shaft and that is used for transmitting rotary motion to the shaft.

As used in this disclosure, a "diameter" of an object is a straight line segment that passes through the center (or center axis) of an object. The line segment of the diameter is terminated at the perimeter or boundary of the object through which the line segment of the diameter runs.

As used in this disclosure, the word "exterior" is used as a relational term that implies that an object is not located or contained within the boundary of a structure or a space.

As used herein, an "eyelet" is a hole intended to receive a string, rope, cord, spring, or hook or a ring intended to reinforce such a hole.

As used in this disclosure, a "fastener" is a device that is used to join or affix two objects. Fasteners generally comprise a first element, which is attached to the first object and a second element which is attached to the second object such that the first element and the second element join to affix the first object and the second object. Common fasteners include, but are not limited to, hooks, zippers, snaps, buttons, buckles, quick release buckles, or hook and loop fasteners.

As used herein, "front" indicates the side of an object that is closest to a forward direction of travel under normal use of the object or the side or part of an object that normally presents itself to view or that is normally used first. "Rear" or "back' refers to the side that is opposite the front.

As used in this disclosure, a "gear" is a toothed wheel, cylinder, or other toothed mechanical element that is used to transmit motion, a change of speed, or a change of direction to second toothed wheel, cylinder, or other toothed mechanical element.

As used in this disclosure, a "handle" is an object by which a tool, object, or door is held or manipulated with the hand.

As used in this disclosure, a "hitch" is a fastening apparatus that attaches an unpowered vehicle to a motorized vehicle such that the motorized vehicle can tow the unmotorized vehicle.

As used herein, "inside diameter" refers to a measurement made on a hollow object. Specifically, the inside diameter is the distance from one inside wall to the opposite inside wall. If the object is round, then the inside diameter is a true diameter, however the term may also be used in connection with a square object in which case the inside diameter is simply the narrowest inside measurement that passes through the center of the object.

As used in this disclosure, the word "interior" is used as a relational term that implies that an object is located or contained within the boundary of a structure or a space.

As used in this disclosure, a "jack" is a mechanical device for lifting heavy loads by means of a force applied with a lever, screw, or hydraulic press.

As used in this disclosure, the word "lateral" refers to the sides of an object or movement towards a side. Lateral directions are generally perpendicular to longitudinal directions. "Laterally" refers to movement in a lateral direction.

As used herein, "outside diameter" refers to a measurement made on an object. Specifically, the outside diameter is the distance from one point on the outside of the object to a point on the opposite side of the object along a line passing through the center of the object. The term outside diameter is frequently used in conjunction with round objects such as hollow conduits in which case the outside diameter is a true diameter, however the term may also be used in connection with a square object in which case the outside diameter is simply the widest outside measurement that passes through the center of the conduit.

As used herein, the word "pivot" is intended to include any mechanical arrangement that allows for rotational motion. Non-limiting examples of pivots may include hinges, holes, posts, dowels, pins, points, rods, shafts, balls, and sockets, either individually or in combination.

As used in this disclosure, a "plate" is a flat, rigid object having at least one dimension that is of uniform thickness and is thinner than the other dimensions of the object. Plates often have a rectangular or disk like appearance. Plates may be made of any material, but are commonly made of metal.

As used in this disclosure, a "spring" is a device that is used to store mechanical energy. This mechanical energy will often be stored by deforming an elastomeric material that is used to make the device, by the application of a torque to a rigid structure, or by a combination thereof. In some embodiments, the rigid structure to which torque is applied may be composed of metal or plastic.

As used herein, "tongue" refers to the frontmost part of a trailer that is used to connect the trailer to a hitch.

As used in this disclosure, a "trailer" is an unpowered wheeled vehicle that is towed by a powered vehicle.

As used in this disclosure, "vertical" refers to a direction that is parallel to the local force of gravity. Unless specifically noted in this disclosure, the vertical direction is always perpendicular to horizontal.

With respect to the above description, it is to be realized that the optimum dimensional relationship for the various components of the invention described above and in FIGS. 1 through 10, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A jack foot adjustment device comprising:
a body, an upper foot, a lower foot, and a foot spring;
wherein the jack foot adjustment device is a tongue jack for a trailer;
wherein the jack foot adjustment device provides a fine height adjustment and a gross height adjustment;
wherein the gross height adjustment is a faster but less precise adjustment of a height of the jack foot adjustment device than the fine height adjustment;
wherein the upper foot comprises a threaded aperture, a release frame, a pawl, a pawl pivot pin, a release handle, a release handle pin, a tensioner spring, and an upper spring anchor;
wherein the upper foot is a cylindrical, middle section of the jack foot adjustment device;
wherein an upper end of the upper foot is closed by a foot top surface except for the threaded aperture located at a center of the foot top surface;
wherein an outside diameter of the upper foot is smaller than an inside diameter of the body such that the upper foot slides in and out of the body as an adjustment screw pulls and pushes on the threaded aperture.

2. The jack foot adjustment device according to claim 1
wherein the body comprises the adjustment screw, a crank handle, a bushing, a handle guide, and a mounting bracket;
wherein the body is a cylindrical, upper section of the jack foot adjustment device;
wherein an upper end of the body is closed by a body top surface except for the bushing located at a center of the body top surface.

3. The jack foot adjustment device according to claim 2
wherein the adjustment screw is a vertical rod that is threaded and attaches to the bushing
wherein the adjustment screw is capable to rotate within the bushing however the adjustment screw is prevented from moving up or down within the bushing.

4. The jack foot adjustment device according to claim 3
wherein an upper end of the adjustment screw extends above the body top surface where the adjustment screw couples to the crank handle;
wherein the crank handle causes the adjustment screw to turn;
wherein the lower end of the adjustment screw passes through the threaded aperture of the upper foot;
wherein as the adjustment screw turns in a first direction, the adjustment screw pushes the body and the upper foot farther apart;
wherein as the adjustment screw turns in a second direction, the adjustment screw pulls the body and the upper foot closer together;
wherein the moving the crank handle to turn the adjustment screw provides the fine height adjustment of the height of the jack foot adjustment device.

5. The jack foot adjustment device according to claim 4
wherein the handle guide is an armature coupled to a side of the body to support the release handle
wherein the handle guide is open on a top and bottom ends of the handle guide and enclosed on three sides, with a four side being enclosed by the body;
wherein the handle guide allows the release handle to move up and down but prevents the release handle from moving laterally.

6. The jack foot adjustment device according to claim 5
wherein the mounting bracket is coupled to the body;
wherein the mounting bracket is configured to couple to the trailer.

7. The jack foot adjustment device according to claim 6
wherein the threaded aperture is an aperture on a top center of the upper foot that is threaded with a thread that is complementary to the thread on the adjustment screw.

8. The jack foot adjustment device according to claim 7
wherein the release frame is an outward extension of the upper foot;
wherein the release frame surrounds the pawl except for an aperture at a top of the release frame where the release handle exits the release frame;
wherein the release frame supports the pawl and protect the pawl from damage;

wherein the release frame is adapted to protect a user from injury.

9. The jack foot adjustment device according to claim 8
wherein the pawl is a pivoting bar whose interior end engages with a plurality of teeth of a cog so that the cog can only move in a vertical direction;
wherein the pawl pivots at the pawl pivot pin whose ends are coupled to the release frame;
wherein an exterior end of the pawl is the release handle;
wherein the tensioner spring is coupled between the release frame and the pawl such that the tensioner spring pulls an interior end of the pawl into the plurality of teeth on the cog.

10. The jack foot adjustment device according to claim 9
wherein the release handle is an L-shaped armature that is used to release the pawl from the cog;
wherein a bottom of the release handle is pivotably coupled to the pawl via the release handle pin;
wherein the release handle extends upwards from the pawl and passes out of the release frame and through the handle guide;
wherein an upper end of the release handle bends away from the body for accessibility.

11. The jack foot adjustment device according to claim 10
wherein pulling up on the release handle causes the pawl to pivot and to disengage from the plurality of teeth of the cog;
wherein when the pawl is disengaged, the lower foot is pulled upwards toward the upper foot by the foot spring unless counteracted by an external downward force;
wherein the gross height adjustment of the height of the jack foot adjustment device comprises disengaging the pawl by pulling up on the release handle and then allowing the lower foot to move up or down under the influence of the foot spring or the external downward force.

12. The jack foot adjustment device according to claim 11
wherein the upper spring anchor is an eyelet or other mechanical fastener coupled to an inside of an upper foot on the foot top surface;
wherein the upper end of the foot spring attaches to the upper spring anchor.

13. The jack foot adjustment device according to claim 12
wherein the lower foot comprises the cog, a lower spring anchor, and a foot plate;
wherein the lower foot is a cylindrical, bottom section of the jack foot adjustment device;
wherein a lower end of the lower foot is closed by a foot bottom surface;
wherein an outside diameter of the lower foot and the cog are smaller than an inside diameter of the upper foot such that the lower foot and the cog slide in and out of the upper foot.

14. The jack foot adjustment device according to claim 13
wherein the cog is a linear gear rack located on an outer side of the lower foot;
wherein the cog is oriented vertically;
wherein the interaction of the cog with the pawl allows the lower foot to move down when the external downward force is applied to overcome tension supplied by the foot spring but prevents upward movement of the lower foot;
wherein when the lower foot is pushed down the pawl pivots to allow a tooth of the plurality of teeth on the cog to pass a tip of the pawl;
wherein the pawl is pulled back into position against the cog by the tensioner spring;
wherein when the lower foot attempts to move up, the pawl jams against the cog and the pawl will not pivot unless the release handle is pulled to pivot the pawl away from the cog.

15. The jack foot adjustment device according to claim 14
wherein the lower spring anchor is an eyelet or other mechanical fastener coupled to an inside of the lower foot on the foot plate;
wherein a lower end of the foot spring attaches to the lower spring anchor.

16. The jack foot adjustment device according to claim 15
wherein the foot plate is a support surface that presses against the ground when the jack foot adjustment device is used to support a tongue end of the trailer;
wherein the foot plate is wider than an outside diameter of the body in all lateral directions;
wherein the foot plate prevents the jack foot adjustment device from sinking into a ground;
wherein the foot plate is adapted to allow the external downward force to be applied by a foot of the user.

17. The jack foot adjustment device according to claim 16
wherein the foot spring is a spring that lifts the lower foot into the upper foot;
wherein the foot spring is coupled between the upper spring anchor on the upper foot and the lower spring anchor on the lower foot;
wherein the tension supplied by the foot spring is such that the foot spring lifts the lower foot if the pawl is disengaged by pulling up on the release handle.

\* \* \* \* \*